US010083481B2

(12) United States Patent
Futch et al.

(10) Patent No.: US 10,083,481 B2
(45) Date of Patent: Sep. 25, 2018

(54) IT RISK MANAGEMENT FRAMEWORK AND METHODS (75) Inventors: Jefre E. Futch, Winter Park, FL (US); Andrew J. Gonczi, Woodstock, GA (US); Roberta J. Mason, Aylesford (GB); Ingrid C. Stuckenberg, St Helens, OR (US)

(73) Assignee: Oracle America, Inc., Redwood Shores, CA (US)

(*) Notice: Subject to any disclaimer, the term of this patent is extended or adjusted under 35 U.S.C. 154(b) by 3483 days.

(21) Appl. No.: 11/346,015

(22) Filed: Feb. 2, 2006

(65) Prior Publication Data
US 2007/0192236 A1 Aug. 16, 2007

(51) Int. Cl.
G06Q 40/00 (2012.01)
G06F 15/173 (2006.01)
G06F 9/44 (2006.01)
G06Q 40/02 (2012.01)

(52) U.S. Cl.
CPC ........... *G06Q 40/00* (2013.01); *G06Q 40/025* (2013.01)

(58) Field of Classification Search
CPC ....... G06Q 40/025; G06Q 40/00; G06Q 40/08
USPC ..................................................... 705/1, 35
See application file for complete search history.

(56) References Cited

U.S. PATENT DOCUMENTS

| 7,613,625 | B2 | 11/2009 | Heinrich | |
|---|---|---|---|---|
| 8,145,449 | B2 | 3/2012 | Shimada et al. | |
| 8,744,894 | B2 | 6/2014 | Christiansen et al. | |
| 8,793,151 | B2 | 7/2014 | DelZoppo et al. | |
| 2003/0149657 | A1* | 8/2003 | Reynolds et al. | 705/38 |
| 2004/0199445 | A1* | 10/2004 | Eder | 705/35 |
| 2005/0114829 | A1* | 5/2005 | Robin et al. | 717/101 |
| 2008/0183521 | A1* | 7/2008 | Parker et al. | 705/7 |

FOREIGN PATENT DOCUMENTS

RU 2634169 C1 10/2017

OTHER PUBLICATIONS

Risk Management, Laurie Williams, 2004 found on the internet at http://agile.csc.ncsu.edu/SEMaterials/RiskManagement.pdf.*
Enterprise Risk Management—Integrated Framework, the Committee of Sponsoring Organizations of the Treadway Commission, 2004 fournd on the internet at http://www.coso.org/publications/erm/coso_erm_executivesummary.pdf.*

* cited by examiner

*Primary Examiner* — Hani M Kazimi
*Assistant Examiner* — Kellie Campbell
(74) *Attorney, Agent, or Firm* — Kilpatrick Townsend & Stockton LLP

(57) ABSTRACT

A method for treating information technology (IT) risk of an organization including identifying a plurality of IT risks, where each of the plurality of IT risks is based on a known problem and is associated with an IT asset classification and an IT consequence classification, calculating a plurality of IT risk exposure indices, where each of the plurality of IT risk exposure indices is associated with at least one of the plurality of IT risks, adjusting each of the plurality of IT risk exposure indices based on a business impact factor to obtain a business impact index, prioritizing the plurality of IT risks by adjusting the business impact index based on a risk treatment factor to obtain a prioritized risk treatment index, and selecting at least one of the plurality of IT risks for treatment based upon the prioritized risk treatment index.

19 Claims, 6 Drawing Sheets

IT RISK MANAGEMENT FRAMEWORK AND METHODS

BACKGROUND

Risk transcends every aspect of business. The need to effectively and efficiently manage risk is a well understood, critical success factor in business, especially in functional disciplines such as finance, insurance, legal, marketing, and so forth. As these and other core business functions have grown more and more dependent on Information Technology (IT), managing IT-related risk has emerged as a critical discipline in running a successful business. Further, IT risk management is becoming a key driver for justifying investments in IT infrastructure and engaging in continuous service improvement programs.

The complexity of an organization's IT ecosystem makes managing IT risk an immense challenge. It requires specific subject matter knowledge at a component, system, and enterprise level. The knowledge required includes what issues may arise given certain conditions, what the measured consequence of these issues are, and how to prioritize and solve these issues.

IT Risk Management disciplines have primarily focused on specific issues concerning security, disaster recovery and project-related risks. Many of the existing IT Risk Management tools are based on the qualitative views of IT experts versus quantified analysis of data (such as what is used in more mature risk management disciplines related to credit, insurance, or medical risk management).

Managing IT risks demands a common means to identify, classify, measure, and communicate risk so that individuals across IT and business organizations gain a shared understanding of the risks and take appropriate actions. Regardless of the approach taken, IT Risk Management should assist in balancing the investment required to improve and upgrade IT with the appropriate return in business value from such an investment.

SUMMARY

In general, in one aspect, the invention relates to a method for treating information technology (IT) risk of an organization including identifying a plurality of IT risks, where each of the plurality of IT risks is based on a known problem and is associated with an IT asset classification and an IT consequence classification, calculating a plurality of IT risk exposure indices, where each of the plurality of IT risk exposure indices is associated with at least one of the plurality of IT risks, adjusting each of the plurality of IT risk exposure indices based on a business impact factor to obtain a business impact index, prioritizing the plurality of IT, risks by adjusting the business impact index based on a risk treatment factor to obtain a prioritized risk treatment index, and selecting at least one of the plurality of IT risks for treatment based upon the prioritized risk treatment index.

In general, in one aspect, the invention relates to a computer system for treating a plurality of information technology (IT) risks including a processor, a memory, and software instructions stored in the memory for enabling the computer system under the control of the processor, to calculate a plurality of IT risk exposure indices, where each of the plurality of IT risk exposure indices is associated with at least one of the plurality of IT risks, where each of the plurality of IT risk exposure indices is adjusted based on a business impact factor to obtain a business impact index, where the business impact index is adjusted based on a risk treatment factor to obtain a prioritized risk treatment index, and where at least one of the plurality of IT risks is selected for treatment based on the prioritized risk treatment index.

In general, in one aspect, the invention relates to a computer readable medium storing instructions for treating a plurality of information technology (IT) risks, the instructions including functionality to calculate a plurality of IT risk exposure indices, where each of the plurality of IT risk exposure indices is associated with at least one of the plurality of IT risks, where each of the plurality of IT risk exposure indices is adjusted based on a business impact factor to obtain a business impact index, where the business impact index is prioritized based on a risk treatment factor to obtain a prioritized risk treatment index.

Other aspects of the invention will be apparent from the following description and the appended claims.

DETAILED DESCRIPTION

Exemplary embodiments of the invention will be described with reference to the accompanying drawings. Like items in the drawings are denoted by the same reference numbers throughout the figures for consistency.

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a method for identifying, prioritizing, and managing IT Risk. More specifically, embodiments of the invention relate to identifying, prioritizing, and managing IT Risk using a variety of numerical indices.

Figure 1:
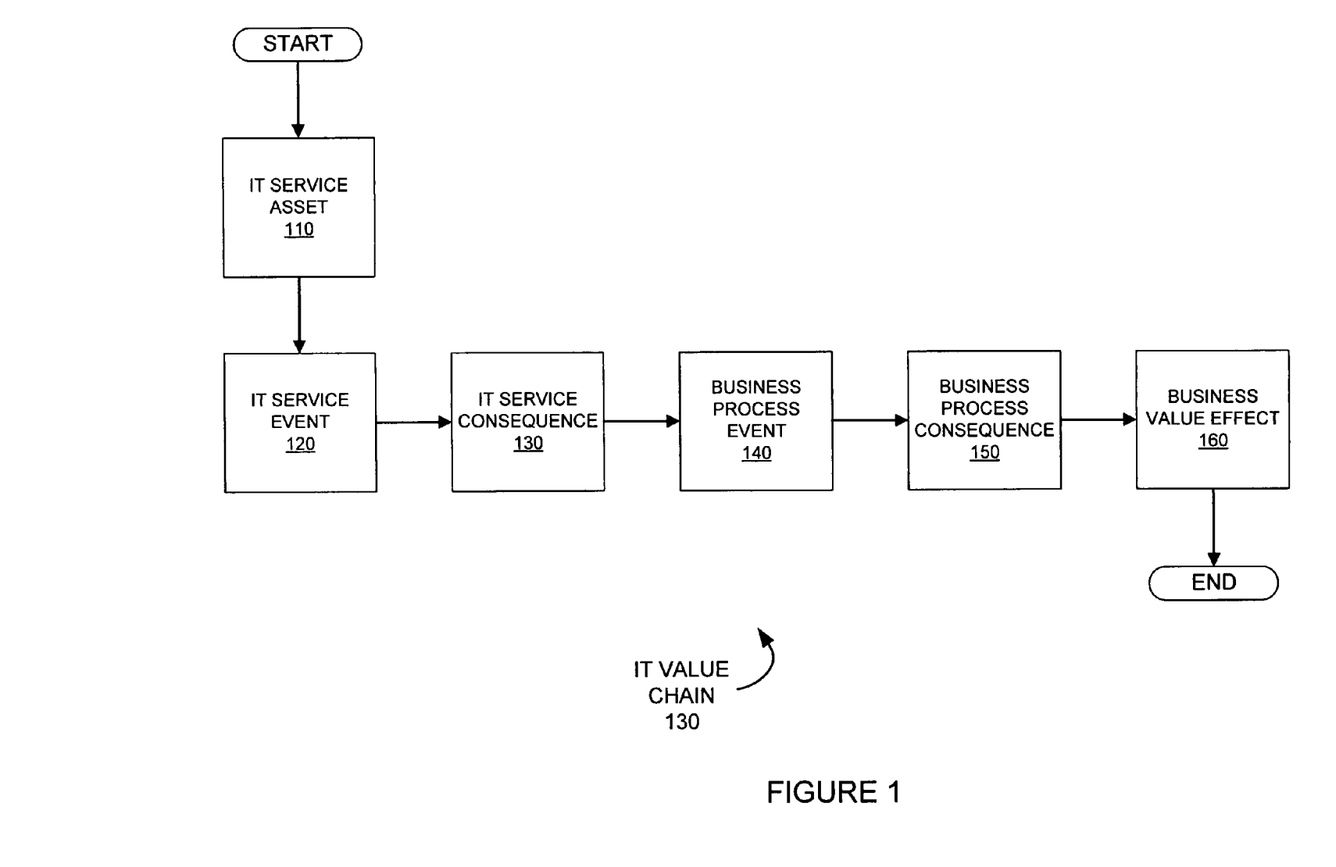
FIG. 1 is a typical IT Value Chain for an organization.

FIG. 1 shows a typical IT Value Chain. An IT Value Chain describes the linkage between IT services and business value. Understanding the IT Value Chain is thus key to relating IT with business value. The value of IT is realized through the quality of service it delivers. The IT Infrastructure Library (ITIL), a series of documents recognized worldwide that are used in implementing framework for IT Service Management, defines a service as "one or more IT systems which enable a business process" and defines systems as "an integrated composite that includes one or more of the processes, hardware, software, facilities, and people, that provides a capability to satisfy a states need or objective."

As shown in FIG. 1, the IT Value Chain (100) begins with the IT Service Assets (110). IT Service Assets (110) execute IT Service Events (120). The execution of these IT Service Events (120) results in either a positive or negative IT Service Consequence (130). The IT Service Consequence (130) then drives a Business Process Event (140) which in turn results in a positive or negative Business Process Consequence (150). The Business Process Consequence (150) realizes an organization's business value (Business Value Effect (160)) including, for example, revenue, cost, profit, stock price, and penalties. Consider the following example. If a broker system (e.g., IT Service Asset (110)) is tasked with processing an electronic trade (e.g., IT Service Event (120)) but the broker system has an outage (i.e., negative IT Service Consequence (130)), and then a given stock trade (e.g., Business Process Event (140)) is not traded (i.e., negative Business Process Consequence (150)), the Business Value Effect (e.g., Business Value Effect (160)) would be loss of revenue. Although the linkage between IT Service Assets (110) and Business Value Effect (160) makes it difficult to measure the value of IT Service Assets (110) directly, measuring and managing the risk of IT Service Assets (110) causing a negative IT Service Consequence is a practical approach to aligning IT with business. One skilled in the art will appreciate that the above example is for illustrative purposes only and is not meant to limit the invention.

Figure 2:
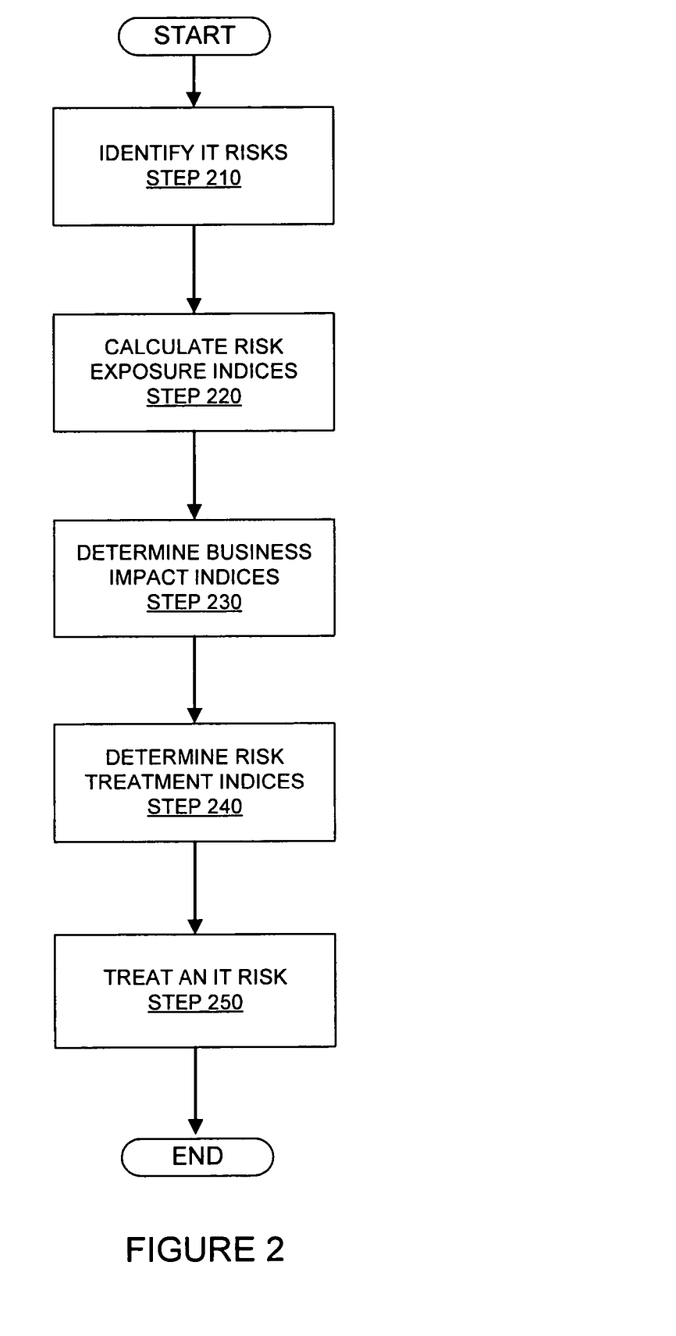
FIG. 2 and FIG. 3 are flowcharts in accordance with one or more embodiments of the present invention.

FIG. 2 shows a flow chart in accordance with one or more embodiments of the invention. Each step that follows is discussed in greater detail below. In STEP 210, IT Risks are identified. In STEP 220, a Risk Exposure Index is calculated for one or more of the identified IT risks. In STEP 230, the Risk Exposure Index is adjusted based on a business factor (discussed below) to obtain a Business Impact Index. In STEP 240, the Business Impact Index is adjusted based on a risk treatment factor (discussed below) to obtain a Risk Treatment Index. In STEP 250, an IT Risk is selected for treatment based on the Risk Treatment Index.

As mentioned above, IT Risks are identified initially (STEP 210). The International Organization for Standardization (ISO) defines risk as the combination of the probability of an event and its consequence. Using this definition and the IT Value Chain (shown above in FIG. 1), an IT Risk has both a source and a sink. The source of an IT Risk is one or more IT Service Asset(s) and the sink of an IT Risk is one or more IT Service Consequence(s). Within a source itself, an IT Risk is invoked by one or more known problems including known errors, known vulnerabilities, and known threats.

Figure 3:
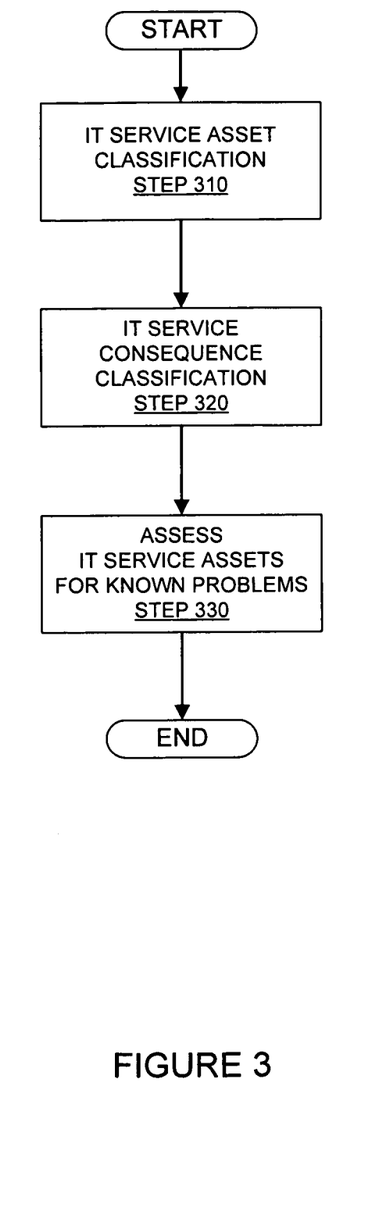

FIG. 3 shows a flowchart in accordance with one embodiment of the present invention. The flowchart shows the steps involved in identifying IT Risks as shown in STEP 210. In STEP 310, IT Service Assets are classified into four functional classes of IT capability: (i) System Execution, (ii) Service Operations, (iii) Solution Development, and (iv) IT Governance (discussed below). Using these asset classes as a baseline, organizations are able to create custom groupings of these capabilities by business function, location, etc. to best report and communicate risk within their enterprise. This provides a hierarchy for quantifying composite risk profiles for various types of risk across the enterprise.

System Execution Capability

System Execution Capability includes the services, business applications and data, middleware, computer platforms, storage network and facilities that provide information, communication and automation to support business processes, business users, suppliers and end customers. An example list of items representative of System Execution Capability is provided in Table 1.

TABLE 1

| System Execution Capability |
| --- |
| 1. Business Application Software and Data Components |
|     Customer-built Application Software & Data<br>    Other Business Application Software & Data |
| 2. Application Infrastructure Components |
|     Directory Software<br>    Database Management Software<br>    Security Software<br>    Transaction Processing Software<br>    Message Queuing Software<br>    Other Middleware Software |
| 3. Systems Platform Components |
|     Hardware<br>    Software<br>    Storage<br>    Configuration<br>    Other System Platform Components |
| 4. Network Components |
|     Connectivity Devices<br>        Routers<br>        Hubs<br>        Switches<br>    VPN Software<br>    Firewall Software<br>    Configuration<br>    Other Network Components |
| 5. Facilities/Environment Components |
|     Air Conditioning Systems<br>    Fire Retardant Systems<br>    Power Systems<br>    Flooring<br>    Space<br>    Other Facilities/Environmental Components |
| 6. Services |
|     Business Services<br>        Customer-defined Services<br>    Infrastructure Services<br>        Directory Services<br>        Database Services<br>        Web Services<br>        Security Services<br>        Network Services<br>        Customer-defined IT Services<br>    Other IT Services |

Service Operations Capability

Service Operations Capability includes the people, process and tools that control, operate and optimize the provision and execution of information, communication, and automation services to meet service level requirements. An example list of items representative of Service Operations Capability is provided in Table 2.

TABLE 2

| Service Operations Capability |
| --- |
| 1. Service Operations People Capability |
|     Organizing Capability<br>    Resourcing Capability<br>    Skills Development Capability<br>    Workforce Management Capability<br>    Knowledge Management Capability<br>    People Qualifications<br>        Managers<br>             Data Center Managers<br>                Individual 1<br>                Individual 2<br>                Individual n |

TABLE 2-continued

| Service Operations Capability |
|---|
|         Problem Managers |
|         Service Level Managers |
|         Change Managers |
|         Other Managers |
|     Analysts |
|         Capacity Planners |
|         Performance Analysts |
|         Systems Analyst |
|         Problem Analyst |
|         Other Analysts |
|     Administrators |
|         Systems Administrators |
|         Database Administrators |
|         Network Administrators |
|         Other Administrators |
|     Operators |
|         Help Desk Coordinator |
|         Tape/Backup Operator |
|         System Operator |
|         Other Operators |
|     Other Operations Roles |
| 2. Service Operations Process/Function Capability |
|     Service Delivery Process Capability |
|         Service Level Management |
|         Availability Management |
|         IT Service Continuity Management |
|         Security Management |
|         Capacity Management |
|         Financial Management |
|     Service Support Process Capability |
|         Service Desk |
|         Availability Management |
|         IT Service Continuity Management |
|         Security Management |
|         Capacity Management |
|         Financial Management |
| 3. Service Operations Tools Capability |
|     Tools Instrumentation |
|     Element and Resource Management |
|         Monitoring Tools |
|         Measurement Tools |
|         Control Tools |
|         Administration Tools |
|         Backup Tools |
|         Diagnostic Tools |
|         Security Tools |
|         Distribution Tools |
|     Event and Information Management |
|         Event Processing Tools |
|         Performance Analysis Tools |
|         Capacity Planning Tools |
|         Notification Tools |
|         Configuration Maintenance Tools |
|         Report Generation Tools |
|     Service Level Management |
|         Transaction Generators |
|         Correlation Engines |
|         Service Level Management Reporting |
|     Workflow and Portal Systems |
|         Process and Workflow Systems |
|         Management Portal |
|     Architecture and Implementation |
|         Specification of Architecture |
|         Breadth of Functionality |
|         Degree of Visibility |
|         Integration of Components |
|         Process Automation |

Solution Development Capability

Solution Development Capability includes the people, process and tools that design, build, test and deploy IT systems to solve business needs. An example list of the items representative of Solution Development Capability provided in Table 3.

TABLE 3

| Solution Development Capability |
|---|
| 1. Solution Development People Capability |
|     Organizing Capability |
|     Resourcing Capability |
|     Skills Development Capability |
|     Workforce Management Capability |
|     Knowledge Management Capability |
|     People Qualifications |
|         Managers |
|             Development Managers |
|                 Individual 1 |
|                 Individual 2 |
|                 Individual n |
|             Project Managers |
|             Other Managers |
|         Architects |
|             Enterprise Architects |
|             Application Architects |
|             System Architects |
|             Network Architects |
|             Database Architects |
|             Security Architects |
|             Other Architects |
|         Analysts |
|             Database Analysts |
|             Application Analysts |
|             System Analysts |
|             Testing Analysts |
|             Other Analysts |
|         Programmers |
|             User Interface |
|             Server |
|             Other Programmers |
|     Other Development Roles |
| 2. Solution Development Process Capability |
|     Process Management |
|         Process Focus |
|         Process Definition |
|         Training |
|         Performance Measurement |
|         Innovation and Deployment |
|     Project Management |
|         Project Planning |
|         Project Monitoring & Control |
|         Supplier Agreement Management |
|         Risk Management |
|         Integrated Teaming |
|         Quantitative Project Management |
|     Engineering |
|         Requirements Management |
|         Requirements Development |
|         Technical Solution |
|         Solution/Product Integration |
|         Verification |
|         Validation |
|     Support |
|         Configuration Management |
|         Quality Assurance |
|         Measurement & Analysis |
|         Decision Analysis & Resolution |
|         Organizational Environment for Integration |
|         Causal Analysis and Resolution |
| 3. Tools |
|     Analysis & Design Tools |
|     Coding/Debugging/Compiler Tools |
|     Software Configuration Management Tools |
|     Performance/Code Profiling Tools |
|     Testing/Test Reporting Tools |
|     Project Planning & Tracking Tools |
|     Process & Document Management Tools |

IT Governance Capability

IT Governance Capability includes the people, process, and tools that exercise the authority to ensure IT is aligned with the business strategy, resources are used responsibly for maximum economical value, and IT risks are known and managed. An example list of items representative of IT Governance Capability is provided in Table 4.

TABLE 4

IT Governance Capability

1. IT Governance People Capability

Managers
    Auditors
2. IT Governance Process Capability The following are the processes to identify and manage
Key Performance Indicators (KPIs), Critical Success
Factors (CSFs), and Key Goal Indicators (KGIs).
    Planning & Organization
        Strategic IT Plan Definition
        Information Architecture Definition
        Technological Direction Definition
        IT Organization and Relationships Definition
        IT Investment Management
        Management Aims and Direction Communication
        Human Resource Management
        External Requirements Compliance
        Risk Assessment
        Project Management
        Quality Management
    Acquisition & Implementation
        Automated Solutions
        Application Software Acquisition and Maintenance
        Technology Infrastructure Acquisition and Maintenance
        Procedure Development and Maintenance
        Systems Installation and Accreditation
        Change Management
    Delivery & Support
        Service Level Definition & Management
        Third-Party Services Management
        Performance & Capacity Management
        Continuous Service Assurance
        Systems Security Assurance
        Cost Identification and Allocation
        User Education
        Customer Assistance and Advisory
        Configuration Management
        Problem and Incident Management
        Data Management
        Facilities Management
        Operations Management
    Monitoring
        Process Monitoring
        Internal Control Assessment
        Independent Assurance
        independent Audit
3. IT Governance Tools Capability     KPI and KGI Tracking Tools
    Communication Tools Continuing with FIG. 3, in STEP 320, IT Service Consequences are classified to enable consistent measurement, reporting and communication of IT Risk. IT Service Consequences are classified into three primary functions: IT Service Production Consequences, IT Development Project Consequences, and IT Governance Consequences.

IT Service Production Consequences

IT Service Production Events are the collection of activities resulting from automation, information, and communication services to business processes. These IT Service Consequences are produced by actions taken by the System Execution Capability and the Service Operation Capability (described above). IT Service Production Consequences may be further classified into:

Continuity & Availability Consequences—consequences affecting the required level of service availability, system reliability, and continuous operations.

Security & Integrity Consequences—consequences affecting data and system protection, data accuracy, and compliance in adhering to requirements and regulations.

Agility & Capacity Consequences—consequences affecting the flexibility and mobility of an enterprise to maximize business results, and required levels of performance, power, storage, memory etc.

Serviceability & Manageability Consequences—consequences affecting ability to repair and recover; visibility, measurements and controls to ensure proper function and quality of service; efficiency in saving money by optimizing performance among heterogeneous suppliers.

IT Development Project Consequences

IT Development Project Events are the collection of activities that create and release new system execution capabilities. These events are produced by the actions taken by the IT Solution Development Capability and pre-production System Execution Capability. The primary classification of IT Development Project Consequences may include New/Changed System Capability, On-time/On-budget Goals, Return on Investment Expectations, Service Production Risks, and Competitiveness & Agility.

IT Governance Consequences

IT Governance Control Events are the collection of activities that ensure alignment and compliance with organizational policies, standards, budgets, plans, process, etc. These events are produced by the actions taken by the IT Governance Capability. The primary classifications of IT Governance Consequences may include Compliance, Financial, Continuous Improvement, and Competitiveness and Agility.

Still referring to FIG. 3, in STEP 330, the IT Service Assets are assessed for known problems. In one or more embodiments of the invention, IT Service Assets are assessed for known problems using best practice knowledgebases and/or maturity models. Best practice knowledgebase's and maturity models are benchmarks and certifications to identify sources of risk and gaps in an IT Service Asset's capability. As known problems are associated with specific IT Service Asset classes, different best practice knowledgebases and/or maturity models may be used among the different IT Service Assets classes to identify the known problems.

In one or more embodiments of the invention, a service excellence index (SEI) is used to examine an IT Service Asset class for known problems and quantify the result. The SEI is based upon best practice knowledgebases and/or maturity models (discussed above) and has established rules related to each known problem. An IT Service Asset is examined with these rules and a determination is made if the IT Service Asset has passed or failed a rule. The SEI scores the total number of passed and/or failed rules. The SEI may also score the IT Service Asset's quality.

In one or more embodiments of the invention, a service offering and/or automation tool includes the SEI. Those skilled in the art will appreciate that many companies provide such service offerings and automation tools with each company using its own proprietary name. Table 5 outlines the names and descriptions for some of the available services and tools available from companies, such as Sun Microsystems, Inc., including the SEI.

TABLE 5

Service Offerings & Tools Including SEI

| IT Service Asset Class/Subclass | | Service | Service Automation |
|---|---|---|---|
| IT System Execution Capability | Overall Architecture | Architecture Assessment | none |
| | Business Application & Application Infrastructure | Java Application Assessment Service | none |
| | System Platform | RAS Profile, Sun Install Check, System Checkup; Security Assessment | ERAS, Griffon |
| | Network | Service Delivery Network (SDN) Architecture Assessment | none |
| | Facilities/ Environment Services | Environmental Assessment | none |
| | | SunReady Assessment for SunTone | AGAT |
| IT Service Operations Capability | Overall - People, Process and Tools | Operations Capability Assessment (OCA) based on IT Infrastructure Library (ITIL) and Sun's Operations Management Capability Model (OMCM) formerly known as Sun Ready Availability Assessment (SRAA). SunTone Certification Audit. | AGAT - Availability Gap Analysis Tool |
| | Operations People | SunED Skills Assessment | Web-based tool |
| IT Solution Development Capability | Overall - People, Process and Tools | Custom service offerings | none |
| | Development People | SunED Skills Assessment | Web-based tool |
| IT Governance Capability | Overall - People, Process and Tools | Custom service offerings | none |

Figure 4:
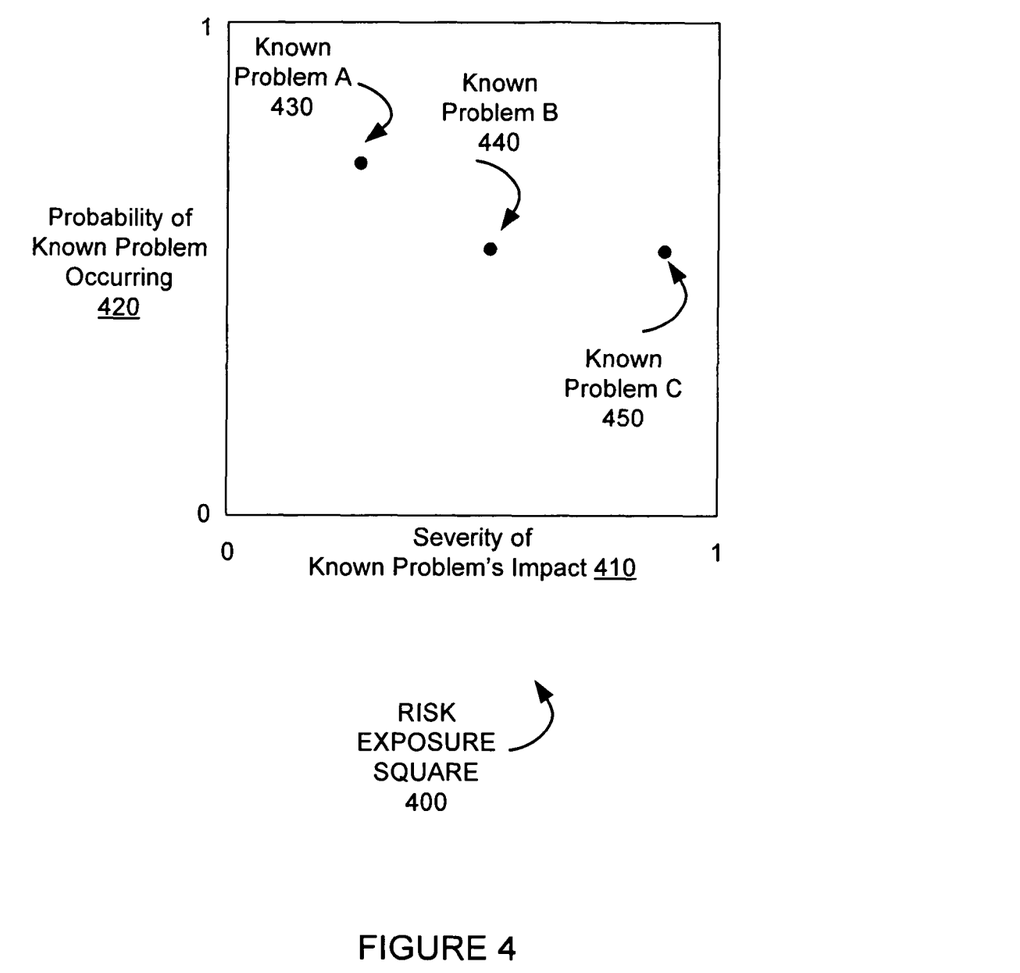
FIG. 4 is a Risk Exposure Square in accordance with one or more embodiments of the present invention.

Referring back to FIG. 2, once IT Risks have been identified and classified (STEP 210), a Risk Exposure Index (REI) is calculated for one or more IT Service Assets having one or more of the identified IT Risks (STEP 220). In one or more embodiments of the invention, an REI is calculated using a Risk Exposure Square. FIG. 4 is an example Risk Exposure Square (400) in accordance with one or more embodiments of the present invention. Each IT Service Asset has a Risk Exposure Square (400) for each IT Service Consequence. As shown in FIG. 4, the Risk Exposure Square (400) is a plot with points (Known Problem A (430), Known Problem B (440), Known Problem C (450)). Each point (Known Problem A (430), Known Problem B (440), Known Problem C (450)) represents a known problem associated with the IT Service Asset and the IT Service Consequence of the Risk Exposure Square (400). The horizontal axis of the Risk Exposure Square (400) represents the severity of the known problem's impact (410). The vertical axis of the Risk Exposure Square (400) represents the probability of the known problem occurring (420). Those skilled in the art will appreciate that, while not shown, other axis configurations are possible.

In other words, each known problem associated with the given IT Service Asset and given IT Service Consequence is an ordered pair. The first element of the ordered pair is the severity of the known problem's impact. The second element of the ordered pair is the probability of the known problem occurring. These two values define the location of the point associated with the known problem on the Risk Exposure Square (400). The intersection of the severity axis with the probability axis represents zero risk. The severity of a known problem's impact is assigned a value between 0 and 1. The probability of a known problem occurring is assigned a value between 0 and 1. These values must be assigned by one who is sufficiently knowledgeable with the known problems and a typical organization's IT Infrastructure. Overestimating these values may result in overestimating the IT Risk. Underestimating these values may result in underestimating the IT Risk.

Once the known problems associated with the IT Service Asset and the IT Service Consequence have been plotted on a Risk Exposure Square, the Risk Exposure Index (REI) for the Risk Exposure Square (400) may be calculated. In one or more embodiments of the invention, the REI is given by the equation:

$$REI = \frac{1}{N\sqrt{2}} \sum_{i=1}^{N} \sqrt{(S_i^2 + P_i^2)} \quad (1)$$

where N is the number of known problems plotted on the Risk Exposure Square, $S_i$ is the severity of the $i^{th}$ known problem's impact, and $P_i$ is the probability of the $i^{th}$ known problem occurring. Those skilled in the art will recognize component $\sqrt{(S_i^2+P_i^2)}$ of equation (1) as the distance between zero risk and the plotted point representing the $i^{th}$ known error. Those skilled in the art will also recognize $0 \leq REI \leq 1$.

Consider the following example. This example is not meant to limit the invention. In this example, "hardware" is identified as an IT Service Asset and "cause-outage" is defined as an IT Service Consequence. Let the Risk Exposure Square (400) shown in FIG. 4 be associated with the "hardware" IT Service Asset and the "cause-outage" IT Service Consequence. The three points (Known Problem A (430), Known Problem B (440), Known Problem C (450)) shown in FIG. 4 are thus known problems associated with the "hardware" IT Service Asset and the "cause-outage" IT Service Consequence. An REI may be calculated for the hardware/cause-outage Risk Exposure Square (400) using equation (1). Let "software", "storage", and "configuration" be other IT Service Assets. Let "extend-outage" be another IT Service Consequence. A risk exposure square may be constructed for each IT Service Asset and IT Service Consequence pair. An REI may be calculated for each of the risk exposure squares using equation (1).

As discussed above, known problems are associated with an IT Service Asset class and an IT Service Consequence class. However, it may often be the case that the IT Service Asset class with the known problems is a subclass of a more general IT Service Asset class (i.e., a parent class). Further, it may also be the case that the parent IT Service Asset class is more easily related to a Business Process Event and/or a Business Value Effect. Thus, it may be desirable to use the REIs of subclasses to establish a composite REI for the associated parent class.

Figure 5:
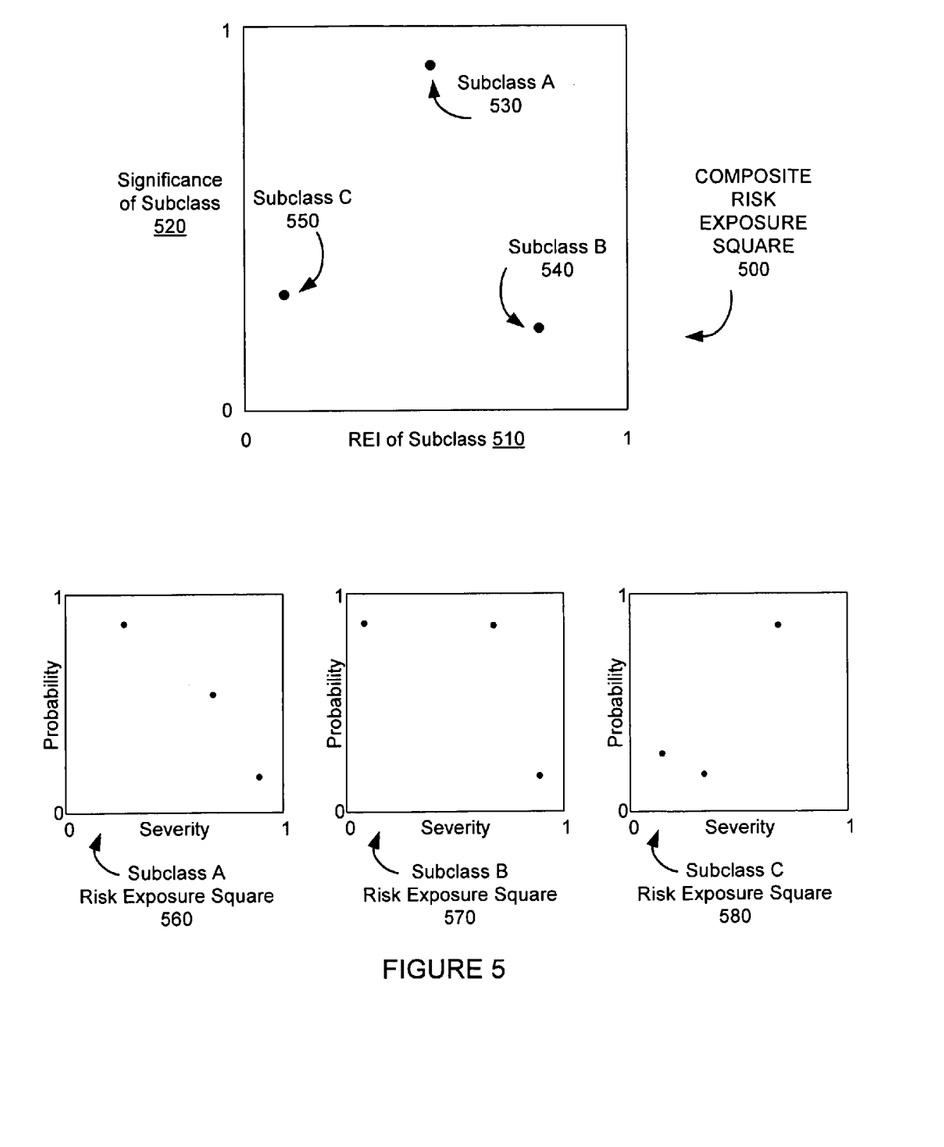
FIG. 5 is a Composite Risk Exposure Square in accordance with one or more embodiments of the present invention.

Composite risk exposure squares provide a method to combine the REIs of risk exposure squares associated with IT Service Asset subclasses and IT Service Consequence subclasses into an accumulated risk exposure index, also known as a composite risk exposure index, for a parent class. FIG. 5 shows a Composite Risk Square in accordance with one or more embodiments of the invention. As shown in FIG. 5, the Composite Risk Exposure Square (500) is created using the Risk Exposure Squares of subclasses (Subclass A Risk Exposure Square (560), Subclass B Risk Exposure Square (570), Subclass C Risk Exposure Square (580)). The Composite Risk Exposure Square (500) is a plot with points (Subclass A (530), Subclass B (540), Subclass C (550)). Each point (Subclass A (530), Subclass B (540), Subclass C (550)) is associated with the Risk Exposure Square of an IT Service Asset subclass or an IT Service Consequence subclass.

In accordance with one or more embodiments of the invention, the horizontal axis of the Composite Risk Exposure Square (500) is the REI associated with a subclass Risk Exposure Square (Subclass A Risk Exposure Square (560), Subclass B Risk Exposure Square (570), Subclass C Risk Exposure Square (580)). The range for the REI value is between 0 and 1. In accordance with one or more embodiments of the invention, the vertical axis of the Composite Risk Exposure Square (500) represents the significance of the subclass to the parent class (520). It has values between 0 and 1. The intersection of the vertical axis and horizontal axis represents zero risk. In other words, every point on the Composite Risk Exposure Square is an ordered pair. The first element of the ordered pair is the REI associated with the subclass Risk Exposure Square. The second element of the ordered pair is the significance of the subclass to the parent. The significance value may be assigned by one who is sufficiently knowledgeable with the known problems and a typical organization's IT Infrastructure.

Once the Composite Risk Exposure Square (500) has been plotted, the Composite Risk Exposure Index for the Composite Risk Exposure Square (500) may be calculated. In one or more embodiments of the invention, the composite REI is given by the equation:

$$\text{Composite } REI = \frac{1}{M\sqrt{2}} \sum_{j=1}^{M} \sqrt{(R_j^2 + Sg_j^2)} \quad (2)$$

where M is the number of subclasses represented on the Composite Risk Exposure Square (500), $R_j$ is the REI of the $j^{th}$ subclass and $Sg_j$ is the significance of the $j^{th}$ subclass to the parent class. Those skilled in the art will recognize component $\sqrt{(R_j^2+Sg_j^2)}$ of equation (2) as the distance between zero risk and the plotted point representing the $j^{th}$ risk exposure square. Those skilled in the art will also recognize 0≤Composite REI≤1.

Continuing with the example discussed above, "software," "hardware," "storage," and "configuration" is IT Service Assets. Similarly, "cause-outage" and "extend-outage" are IT Service Consequences. The "software", "hardware", "storage", and "configuration" classes may be viewed as subclasses of a broader parent "System-Platform" IT Service Asset class. The "cause-outage" and "extend-outage" classes may be viewed as subclasses of a broader parent "Availability-Continuity" IT Service Consequence class.

Using equation (2) and both the REI and significance value associated with each of the software/cause-outage, hardware/cause-outage, storage/cause-outage, and configuration/cause-outage risk exposure squares, the composite REI for the System-Platform/cause-outage composite risk exposure square can be calculated. In a similar fashion, using equation (2) and both the REI and significance value associated with each of the software/extend-outage, hardware/extend-outage, storage/extend-outage, and configuration/extend-outage risk exposure squares, the composite REI for the System-Platform/extend-outage composite risk exposure square can be calculated. The use of composite risk exposure squares may continue up the classification hierarchy. In other words, composite risk exposure squares may be used over and over to effectively "roll-up" the REIs and Composite REIs of subclasses to calculate a composite risk exposure index for a parent class. For example, the System-Platform/extend-outage composite risk exposure square and System-Platform/cause-outage composite risk exposure square may be used, with equation (2), to create a composite risk exposure index for System-Platform/Availability-Continuity.

Referring back to FIG. 2, once REIs have been calculated for the IT Service Assets (STEP 220), the REIs are used to generate the Business Impact Indices (STEP 230). The Business Impact Index (BII) assesses the impact of an IT Service Asset's risk exposure on the business. The BII score represents an adjusted REI score of an IT Service Asset. The BII is generated by adjusting an IT Service Asset's REI based on several business factors including the critical nature of the affected business system(s), financial impact of the business process, an enterprise's business size, industry or market characteristics, and the business organization's risk perception. In one or more embodiments of the invention, an affected business system may be classified into one of four profiles: Life Critical, Mission Critical, Business Critical, and Task Critical.

Life Critical: Service availability failure has immediate and direct life-threatening implications.

Mission Critical: If the service is down, vital business processes and customers are affected in a way that has a massive impact—if the Service is down, the Business is down.

Business Critical: Service downtime may not be visible to customers, but significant costs are incurred through lost productivity. If these services are down, business could still be transacted, but certain employees may be idle or unproductive while unavailable.

Task Critical: Service outage affects only a few users, or the impact is limited and cost is deemed insignificant.

An IT Service Asset's REI may be adjusted based, in part, on the classification of the affected business system(s) to create the BII. For example, although an IT Service Asset may have a large REI, if it affects a business system which is only "Task Critical" there is less of a business exposure than if it affects a business system which is "Life Critical". The REI for the IT Service Asset would be adjusted to reflect this difference in impact, thus producing the BII.

Still referring to FIG. 2, following the generation of the BII (STEP 230), each BII may be adjusted to generate a Risk Treatment Index (RTI). The RTI reflects the ability of the IT Risk to be treated. The adjustment is based on the recovery effectiveness, risk treatment alternatives, and the cost of mitigation for each identified known problem. In other words, the RTI enables a prioritized risk list of IT Service Assets.

The final step in FIG. 2 is treating at least one of the identified IT Risks (STEP 250). The selection of the IT Risk for treatment is based upon the prioritized risk list of IT Service Assets provided by the RTI in addition to the organization's risk acceptance policies. Once an IT Risk is selected, it is treated using best practice knowledgebases. IT Risk treatment includes mitigating, eliminating, and/or controlling the one or more known problems that may invoke the IT Risk. The Best Practice Knowledgebases provide various alternative approaches to mitigating, eliminating, and/or controlling these one or more known problems as well as methodologies for implementing these treatments.

Consider the following example. The System Checkup Service (discussed above in Table 5) may be used to identify known system problems. After assessing (e.g., REI) and prioritizing (e.g., BII, RTI) the identified IT risks for treatment, it may be determined that an operating system parameter on a set of mission critical servers has the highest risk of causing an outage. A best practice knowledgebase, such as the SunSolve knowledgebase available from Sun Microsystems, Inc., may be consulted for the proper parameter settings and specific procedures to implement the recommended change. Consider yet another example. The Operations Capability Assessment (OCA) (discussed above in Table 5) may be used to identify known operations process problems and known tools problems. After assessing (e.g., REI) and prioritizing (e.g., BII, RTI) the identified IT risks for treatment, it may be determined that change management has a high level of risk. A best practice knowledgebase, such as the IT Infrastructure Library or the Operations Management Capability Model available from Sun Microsystems, Inc., may be consulted to determine and provide both the appropriate levels of process and tools as well as a plan to implement the change management process and tools.

Embodiments of the invention may provide a holistic classification method to identify risk by IT Service Asset and IT Consequence, express relationships between an IT Service Asset, its associated IT Risk, and a business value, and define methods to prioritize treatment of IT Risks through structured IT Risk indices.

Figure 6:
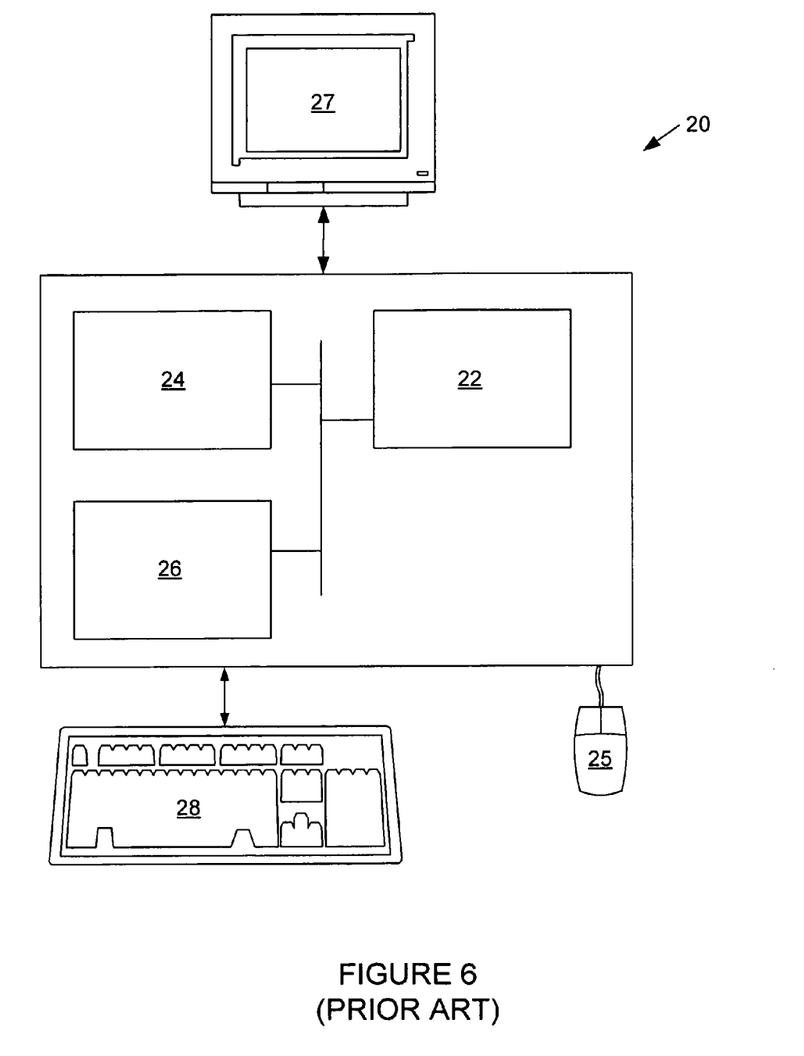
FIG. 6 is a typical computer system.

The invention may be implemented on virtually any type of computer regardless of the platform being used. For example, as shown in FIG. 6, a computer system (20) includes a processor (22), associated memory (24), a storage device (26), and numerous other elements and functionalities typical of today's computers (not shown). The computer (20) may also include input means, such as a keyboard (28) and a mouse (25), and output means, such as a monitor (27). The computer system (20) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (20) may be located at a remote location and connected to the other elements over a network. Further, software instructions to perform embodiments of the invention may be stored on a computer readable medium such as a compact disc (CD), a diskette, a tape, a file, or any other computer readable storage device.

While the invention has been described with respect to a limited number of embodiments, one skilled in the art, having benefit of this disclosure, can appreciate that other embodiments can be devised which do not depart from the scope of the invention as disclosed herein. Accordingly, the scope of the invention should be limited only by the attached claims.

The invention claimed is:

1. A computer system for selecting an information technology (IT) risk for treatment, comprising:
a processor;
a memory; and
software instructions stored in the memory and configured to be executed by the processor to perform a method, the method comprising:
identifying a plurality of IT risks to one or more hardware servers, wherein the plurality of IT risks are risks of outages of a hardware server of the one or more hardware servers, and wherein each of the plurality of IT risks is based on a known problem and is associated with one of a plurality of IT asset classifications and one of a plurality of IT consequence classifications;
for each of the plurality of IT risks:
determining a probability value (P) to measure a probability of the IT risk occurring,
determining a severity value (S) to measure a severity of an impact of IT risk,
calculating a subclass IT risk exposure index based on a square root of $(P^2+S^2)$,
obtaining a subclass significance value for the subclass IT risk exposure index quantifying the significance of the subclass IT risk to a parent IT risk,
calculating a composite IT risk exposure index for the parent IT risk based on a plurality of IT risk exposure indexes and a plurality of significance values, wherein the subclass IT risk exposure index is one of the plurality of IT risk exposure indexes, wherein the subclass significance value is one of the plurality of significance values, and wherein the composite IT risk exposure index is a first quantitative score associated with the IT risk,
generating a business impact index based on the composite IT risk exposure index and at least one business impact associated with the IT risk, wherein the business impact index is a second quantitative score associated with the IT risk, and
generating a risk treatment index based on the business impact index and at least one factor affecting an ability to treat the IT risk, wherein the risk treatment index is a third quantitative score associated with the IT risk;
prioritizing the plurality of IT risks based on the risk treatment index of each IT risk;
selecting at least one of the plurality of IT risks for treatment based upon the priority of each of the plurality of IT risks and at least one risk acceptance policy; and
treating the selected at least one of the plurality of IT risks by changing one or more system parameters on the hardware server implicated by the at least one of the plurality of IT risks, wherein the one or more system parameters address a corresponding known problem associated with the at least one of the plurality of IT risks causing an outage of the hardware server.

2. The computer system of claim 1, further comprising software instructions to determine the plurality of IT risk exposure indices, wherein the software instructions enable the computer system to: wherein calculating the subclass IT risk exposure index comprises:
plotting a first point representing the IT risk on a risk exposure square, wherein the risk exposure square is a graph having a vertical axis measuring probability values and a horizontal axis measuring severity values.

3. The computer system of claim 2, wherein calculating the subclass IT risk exposure index further comprises:
determining a distance between the first point and a second point on the risk exposure square, wherein the second point corresponds to a zero probability value and a zero severity value.

4. The computer system of claim 1, wherein the at least one business impact associated with the IT risk comprises at least one selected from a group consisting of business size, market, business system criticality, and risk perception.

5. The computer system of claim 1, wherein the at least one factor comprises at least one selected from a group consisting of recovery effectiveness, mitigation cost, and risk treatment alternatives.

6. The computer system of claim 1,
wherein treating the selected at least one of the plurality of IT risks comprises treating the at least one of the plurality of IT risks according to a best practice knowledgebase.

7. The computer system of claim 1, wherein each of the plurality of IT asset classifications comprises one selected from a group consisting of system execution, service operations, solution development, and IT governance.

8. A non-transitory computer-readable storage medium storing instructions for selecting an information technology (IT) risk for treatment, the instructions executing on a processor and comprising functionality to:
identify a plurality of IT risks to one or more hardware servers, wherein the plurality of IT risks are risks of outages of a hardware server of the one or more hardware servers, and wherein each of the plurality of IT risks is based on a known problem and is associated with one of a plurality of IT asset classifications and one of a plurality of IT consequence classifications;
for each of the plurality of IT risks:
determine a probability value (P) to measure a probability of the IT risk occurring,
determine a severity value (S) to measure a severity of an impact of IT risk,
calculate a subclass IT risk exposure index based on a square root of $(P^2 + S^2)$,
obtain a subclass significance value for the subclass IT risk exposure index quantifying the significance of the subclass IT risk to a parent IT risk,
calculate a composite IT risk exposure index for the parent IT risk based on a plurality of IT risk exposure indexes and a plurality of significance values, wherein the subclass IT risk exposure index is one of the plurality of IT risk exposure indexes, wherein the subclass significance value is one of the plurality of significance values, and wherein the composite IT risk exposure index is a first quantitative score associated with the IT risk,
generate a business impact index based on the composite IT risk exposure index and at least one business impact associated with the IT risk, wherein the business impact index is a second quantitative score associated with the IT risk, and
generate a risk treatment index based on the business impact index and at least one factor affecting an ability to treat the IT risk, wherein the risk treatment index is a third quantitative score associated with the IT risk;
prioritize the plurality of IT risks based on the risk treatment index of each IT risk; and
select at least one of the plurality of IT risks for treatment based upon the priority of each of the plurality of IT risks and at least one risk acceptance policy; and
treat the selected at least one of the plurality of IT risks by changing one or more system parameters on the hardware server implicated by the at least one of the plurality of IT risk, wherein the one or more system parameters address a corresponding known problem associated with the at least one of the plurality of IT risks causing an outage of the hardware server.

9. The non-transitory computer-readable medium of claim 8, wherein calculating the subclass IT risk exposure index comprises:
plotting a first point representing the IT risk on a risk exposure square, wherein the risk exposure square is a graph having a vertical axis measuring probability values and a horizontal axis measuring severity values.

10. The non-transitory computer-readable medium of claim 9, wherein calculating the subclass IT risk exposure index further comprises:
determining a distance between the first point and a second point on the risk exposure square, wherein the second point corresponds to a zero probability value and a zero severity value.

11. The non-transitory computer-readable medium of claim 8, wherein at least one business impact associated with the IT risk comprises at least one selected from a group consisting of business size, market, business system criticality, and risk perception.

12. The non-transitory computer-readable medium of claim 8, wherein the at least one factor comprises at least one selected from a group consisting of recovery effectiveness, mitigation cost, and risk treatment alternatives.

13. The non-transitory computer-readable medium of claim 8, wherein the functionality to treat the at least one of the plurality of IT risks comprises functionality to treat the selected at least one of the plurality of IT risks according to a best practice knowledgebase.

14. The non-transitory computer-readable medium of claim 8, wherein each of the plurality of IT asset classifications comprises one selected from a group consisting of system execution, service operations, solution development, and IT governance.

15. The non-transitory computer-readable medium of claim 8, wherein each of the plurality of IT consequence classifications comprises one selected from a group consisting of continuity and availability, security and integrity, agility and capacity, manageability and serviceability, development project, and governance control.

16. The non-transitory computer-readable medium of claim 8, wherein identifying the plurality of IT risks comprises using a service excellence index based upon at least one selected from a group consisting of best practice knowledge bases and maturity models.

17. The non-transitory computer-readable medium of claim 8, wherein identifying the plurality of IT risks comprises generating a plurality of linkages between a plurality of IT service assets and at least one business value effect.

18. The computer system of claim 1, wherein each known problem associated with each of the plurality of IT risks is an ordered pair, wherein a first element of the ordered pair is the severity of the impact of the IT risk associated with the known problem, represented by the severity value (S), and a second element of the ordered pair is the probability of the IT risk associated with the known problem occurring, represented by the probability value (P).

19. The non-transitory computer-readable medium of claim 8, wherein each known problem associated with each of the plurality of IT risks is an ordered pair, wherein a first element of the ordered pair is the severity of the impact of the IT risk associated with the known problem, represented by the severity value (S), and a second element of the ordered pair is the probability of the IT risk associated with the known problem occurring, represented by the probability value (P).

\* \* \* \* \*

UNITED STATES PATENT AND TRADEMARK OFFICE
CERTIFICATE OF CORRECTION

PATENT NO. : 10,083,481 B2
APPLICATION NO. : 11/346015
DATED : September 25, 2018
INVENTOR(S) : Futch et al.

It is certified that error appears in the above-identified patent and that said Letters Patent is hereby corrected as shown below:

In the Specification

In Column 11, Line 50, delete ""hardware,""storage,"" and insert -- "hardware," "storage," --, therefor.

In the Claims

In Column 15, Line 18, in Claim 8, after "computer-readable" delete "storage".

Signed and Sealed this
Thirty-first Day of December, 2019

Andrei Iancu
*Director of the United States Patent and Trademark Office*